United States Patent
Ottaviano et al.

(10) Patent No.: US 12,445,523 B2
(45) Date of Patent: Oct. 14, 2025

(54) DISCOVERY AND CONFIGURATION OF IoT DEVICES

(71) Applicant: International Business Machines Corporation, Armonk, NY (US)

(72) Inventors: Paolo Ottaviano, Rome (IT); Andrea Tortosa, Rome (IT); Maximiliano Cammisa, Rome (IT); Antonio Di Cocco, Rome (IT)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 16/822,077

(22) Filed: Mar. 18, 2020

(65) Prior Publication Data
US 2021/0297483 A1   Sep. 23, 2021

(51) Int. Cl.
| | |
|---|---|
| *H04L 67/104* | (2022.01) |
| *H04L 67/1061* | (2022.01) |
| *H04L 67/12* | (2022.01) |
| *H05B 45/30* | (2020.01) |
| *H05B 47/16* | (2020.01) |
| *H05B 47/185* | (2020.01) |
| *H05B 47/19* | (2020.01) |
| *H05B 47/195* | (2020.01) |
| *H04W 4/70* | (2018.01) |
| *H04W 84/20* | (2009.01) |

(52) U.S. Cl.
CPC ...... *H04L 67/1046* (2013.01); *H04L 67/1051* (2013.01); *H04L 67/1068* (2013.01); *H04L 67/12* (2013.01); *H05B 45/30* (2020.01); *H05B 47/16* (2020.01); *H05B 47/185* (2020.01); *H05B 47/19* (2020.01); *H05B 47/195* (2020.01); *H04W 4/70* (2018.02); *H04W 84/20* (2013.01)

(58) Field of Classification Search
CPC ...... H04L 41/0806; H04W 4/70; H05B 47/19; Y02B 20/40
USPC .......................................................... 709/220
See application file for complete search history.

(56) References Cited

U.S. PATENT DOCUMENTS

| | | | |
|---|---|---|---|
| 9,900,963 B1 * | 2/2018 | Doll | H05B 45/10 |
| 9,911,118 B2 | 3/2018 | Carlson | |
| 2004/0174829 A1 * | 9/2004 | Ayyagari | H04L 45/02 |
| | | | 370/254 |
| 2013/0128786 A1 * | 5/2013 | Sultan | H04W 52/0238 |
| | | | 370/311 |
| 2014/0241354 A1 | 8/2014 | Shuman et al. | |

(Continued)

OTHER PUBLICATIONS

Loyd, "How to Set Up Your Philips Hue Lights," How-To Geek, Jul. 5, 2017, 29 pages https://www.howtogeek.com/247500/how-to-set-up-your-philips-hue-lights/.

*Primary Examiner* — Suraj M Joshi
*Assistant Examiner* — Sherman Lin
(74) *Attorney, Agent, or Firm* — Yee & Associates, P.C.

(57) ABSTRACT

A method for associating an Internet-of-Things (IoT) device with a wireless network, a method for discovering and logically grouping smart light bulbs, and a smart light bulb. One embodiment may comprise automatically starting a counter on an IoT device in response to initially receiving power from a power supply loop to which the IoT device is connected, and by the IoT device, determining whether to perform a pairing operation for associating the IoT device with a wireless network based at least in part on a state of the counter in the IoT device.

8 Claims, 8 Drawing Sheets

(56) References Cited

U.S. PATENT DOCUMENTS

| | | |
|---|---|---|
| 2014/0244001 A1 | 8/2014 | Glickfield et al. |
| 2014/0244768 A1* | 8/2014 | Shuman .................. H04W 4/70 |
| | | 709/206 |
| 2016/0043962 A1 | 2/2016 | Kim et al. |
| 2017/0005871 A1 | 1/2017 | Smith et al. |
| 2017/0111316 A1* | 4/2017 | Lou ....................... H04L 49/201 |
| 2017/0188242 A1* | 6/2017 | Ghosh ................... H04W 24/08 |
| 2017/0214573 A1* | 7/2017 | Linsky .................... H04W 4/70 |
| 2017/0219234 A1 | 8/2017 | Bhide |
| 2018/0183675 A1* | 6/2018 | Debard ................... H04L 41/12 |
| 2019/0089603 A1 | 3/2019 | Harat et al. |
| 2019/0222594 A1 | 7/2019 | Davis, III et al. |
| 2019/0297102 A1 | 9/2019 | Davis, III et al. |
| 2019/0373066 A1 | 12/2019 | Kapoor et al. |
| 2020/0309974 A1* | 10/2020 | Mondragon ........... G01V 1/008 |

\* cited by examiner

DISCOVERY AND CONFIGURATION OF IoT DEVICES

BACKGROUND

The present disclosure relates to discovery and configuration of devices, and more specifically, to discovery and configuration of IoT devices.

The "Internet of Things," or IoT, generally refers to a network of IoT devices i.e., devices, vehicles, signs, buildings, and other items embedded with electronics, software, sensors, and/or actuators, plus network connectivity, which may enable these objects to collect and exchange data with other IoT devices and/or computer systems. The IoT allows objects to be sensed or controlled remotely across existing network infrastructure, creating opportunities for more direct integration of the physical world into computer-based systems, and resulting in improved efficiency, accuracy, and economic benefits, in addition to reduced human intervention. When IoT is augmented with sensors and actuators, the technology becomes an instance of the more general class of cyber-physical systems, also encompassing technologies such as smart grids, virtual power plants, smart homes, intelligent transportation, and smart cities. Each thing may be uniquely identifiable through its embedded computing system and is able to interoperate within the existing Internet infrastructure.

In the IoT, sensors/devices of many different types and capabilities are deployed for different purposes. These sensors/devices communicate using different protocols/methods, and they require correspondingly different interfaces to manage. These devices are manufactured by many different manufacturers and, as a consequence, have different and quite varied sets of operating characteristics. Further, presently there are different management systems for different types of sensors/devices in these networks. These management systems are often unwieldy, and they are difficult to adapt to the addition of new types of devices/sensors.

SUMMARY

According to embodiments of the present disclosure, a method for associating an Internet-of-Things (IoT) device with a wireless network. One embodiment may comprise automatically starting a counter on an IoT device in response to initially receiving power from a power supply loop to which the IoT device is connected, and by the IoT device, determining whether to perform a pairing operation for associating the IoT device with a wireless network based at least in part on a state of the counter in the IoT device.

According to embodiments of the present disclosure, a method for discovering and logically grouping smart light bulbs. One embodiment may comprise connecting a plurality of smart light bulbs to a common power loop having a power switch, wherein each of the plurality of smart light bulbs includes a LED driver circuit that selectably controls power to a LED, promoting one of the plurality of smart light bulbs to leader using a controller, and closing the power switch to automatically initiate the timer. The LED driver circuit may comprise a timer that initiates upon closure of the power switch, a wireless adapter adapted to receive a group identifier, and a writeable memory that accepts or rejects the group identifier based on a state of the timer.

According to embodiments of the present disclosure, a smart light bulb, comprising a LED and a LED driver circuit that selectably controls power to the LED. The LED driver circuit may comprise a timer that automatically initiates upon receipt of power to the LED driver circuit, a wireless adapter adapted to receive a group identifier directly from another smart light bulb, and a writeable memory that accepts or rejects the group identifier based on a state of the timer.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 7 is a flow chart illustrating one method of normal operation of a follower IoT device, consistent with some embodiments While the invention is amenable to various modifications and alternative forms, specifics thereof have been shown by way of example in the drawings and may be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to discovery and configuration of devices, more particular aspects relate to discovery and configuration of IoT devices. While the present disclosure is not necessarily limited to such applications, various aspects of the disclosure may be appreciated through a discussion of various examples using this context.

Currently, the world is experiencing a dramatic rise in the number of IoT (Internet of Things) devices used in industrial and private environments. The work environment, the home environment, public buildings, city street equipment (e.g., illumination equipment), etc. are increasingly equipped with network enabled devices that are able to connect to other devices, receive commands, transmit information, and perform specific functions.

Smart light bulbs are a type of IoT device used to provide and control lighting levels in rooms. In some embodiments, these IoT devices can be controlled in pre-set groups to pre-set levels and colors to create light scenes. In some embodiments, other types of IoT devices can also be added into the scenes. For example, some scenes may include presets for the desired lighting color, activation of a gas powered fireplace, and/or music playlists and volume. In specific applications, the various IoT devices in a scene may be made by different manufacturers.

Users of some embodiments of this disclosure may use a remote control console to configure their IoT devices e.g., to assign a particular light bulb to a logical group and to set its illumination level. One potential difficulty with some of these embodiments, however, is that the discovery/association of the remote control console to each IoT device (e.g., an individual light bulb) must be repeated for each and every IoT device present in the house. Moreover, in some of these embodiments, the subsequent assignment of each IoT device to the desired logical grouping must be explicitly done one-by-one using the remote control console.

Accordingly, some embodiments may utilize a relatively short (e.g., less than one second) countdown timer (n→0) or counter timer (0→n) triggered by the initial supply and/or resumption of electrical power to a physical group of IoT devices (e.g., via an existing wall mounted light switch in the embodiment of a group of smart light bulbs mounted in a single ceiling surface) to automatically initiate a pairing and logical grouping process, thereby enabling the user to pair and logically group all of the physical IoT devices in one cycle. That is, all of the IoT devices in a physical group in these embodiments may be automatically discovered and logically grouped by the substantially simultaneous supply of power to the group. In this way, these embodiments reduce the time and steps necessary to complete all the IoT registration procedures, as well as reducing complexity for the end user in the registration process.

One feature and advantage of some embodiments is that users no longer need to individually select and assign IoT devices (light bulb) during the process of assigning the IoT devices into logical groups. Another feature and advantage of some embodiments is that users do not need to spread control credentials (e.g., passwords) through all the IoT devices. Instead, if just one IoT device is active, it can run a simple and initial computation to generate a shared secret to be spread throughout the group. In this way, pairing and grouping is both made quicker and simpler without adding significant complexity to the IoT devices themselves. Additionally, in embodiments using a counter timer, the counter timer may always be active. The leader bulb in these embodiments may also transmit the counter's value, thereby also protecting the shared secret without adding significant additional complexity to the IoT devices. Another feature and advantage of some embodiments is that a built-in timer may permit the pairing heterogeneous IoT devices (e.g., smart light bulbs from different manufacturers, different types of smart devices, etc.) and IoT devices on different physical circuits.

Yet another feature and advantage of some embodiments, particularly for use in smart light bulbs, is that they utilize the operational environment of the IoT device 102 to help perform pairing and grouping operations. That is, all of the IoT devices 102 on the same common power loop 104 will receive power at almost the exact same moment in time. Some embodiments may use this moment as a signal to identify other devices 102 that should be part of the same group. Conversely, the relatively short duration of the timer allows these embodiments to filter pairing requests from other devices in the user's home. This feature and advantage, in turn, allows the IoT devices to be paired and grouped in a simple and intuitive manner i.e., by simply closing the power switch 106. This feature and advantage also allows for the pairing and grouping circuitry in the IoT device 102 to be relatively simple, which may allow for less expensive manufacturing costs.

Another feature and advantage of some embodiments may be that they support pairing and grouping operations as part of an ad hoc wireless network. This feature and advantage may be desirable for lighting use because neither the system, the hub, nor the IoT devices need to know how many other IoT devices are in the group at any point in time. As applied to lighting, a homeowner or the like can freely add any or remove follower-role smart light bulbs without having to re-pair or re-group the other bulbs.

Figure 1A:
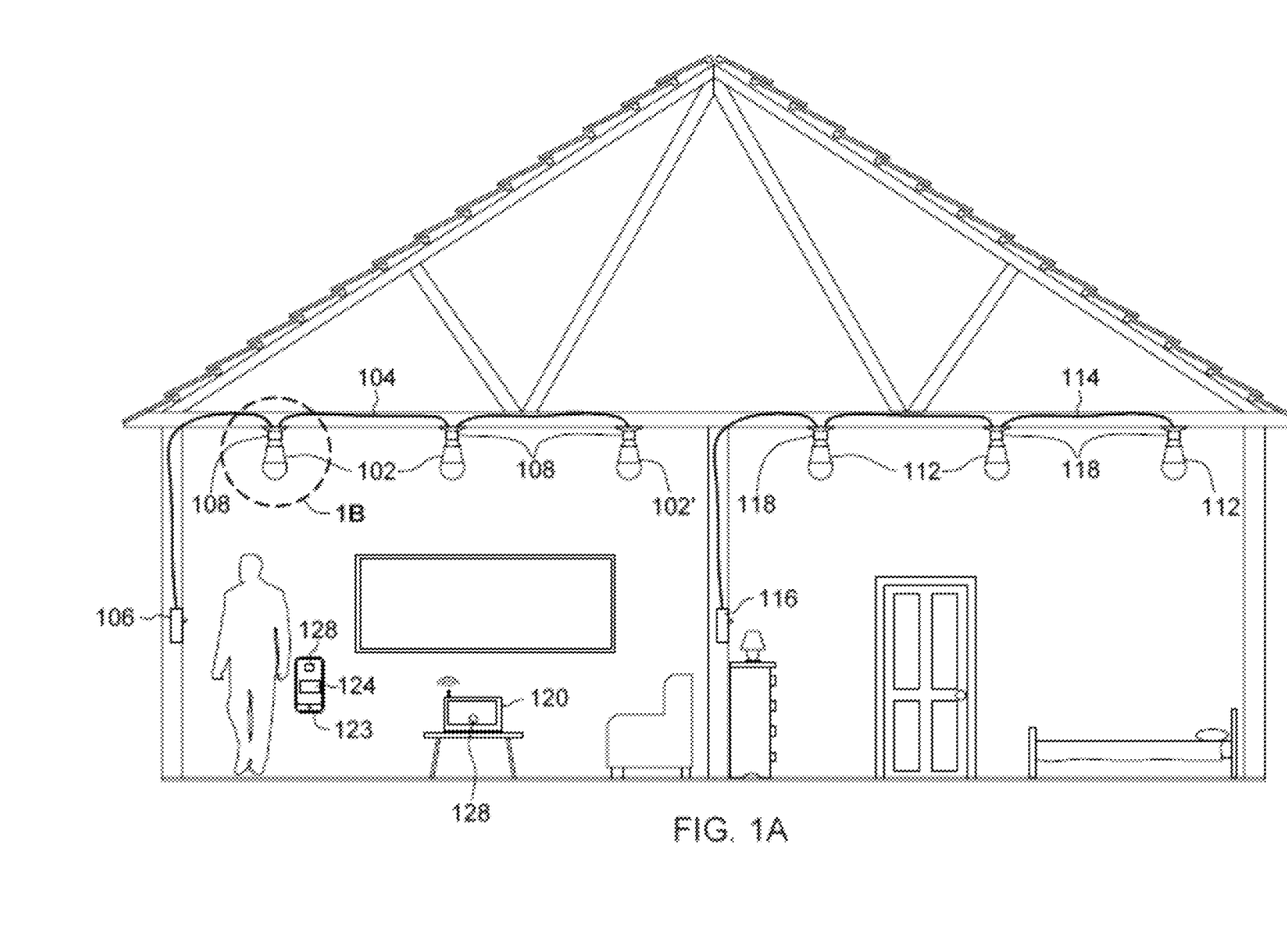
FIG. 1A illustrates one embodiment of a system for discovery and pairing of IoT devices, consistent with some embodiments.
Figure 1B:
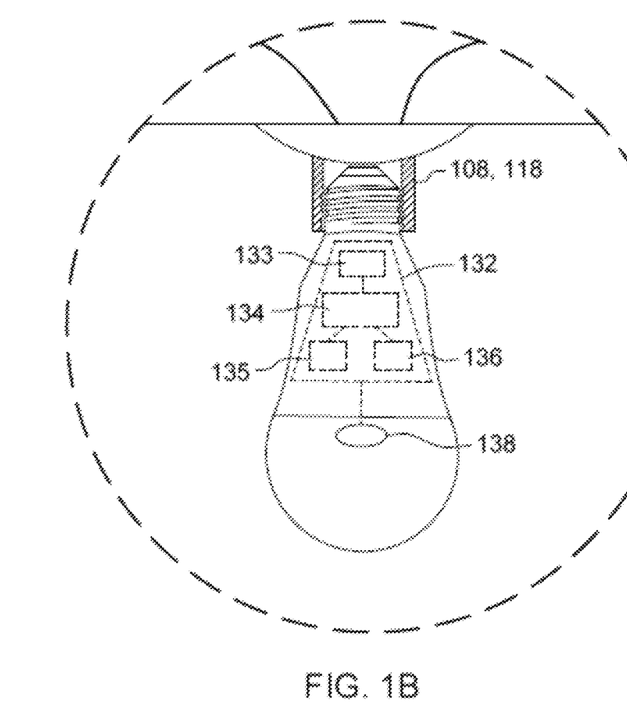
FIG. 1B illustrates one embodiment of a smart IoT device, consistent with some embodiments.

FIG. 1A illustrates one embodiment of a system for discovery and pairing of IoT devices, consistent with some embodiments. FIG. 1B illustrates one embodiment of a smart IoT device, consistent with some embodiments. The system 100 in FIGS. 1A and 1B may comprise a plurality of first IoT devices 102 connected to a first common power supply loop 104 (i.e., electrical current to all of the IoT devices 102 are controlled by the switch or set of switches) via, for example, a plurality of first "ES" standard electrical sockets 108. The system 100 may further comprise a plurality of second IoT devices 112 connected to a second common power supply loop 114 via, for example, a plurality of second "ES" standard electrical sockets 118. The first common power supply loop 104 may include one or more first power switches 106 controlling the flow of electrical current to the plurality of first electrical sockets 108, and the second power supply loop 114 may include one or more power switches 106 controlling the flow of electrical circuit to the plurality of second electrical sockets 118.

Each IoT device 102, 112 in this embodiment may include a base unit 130 sized and shaped for compatibility with the electrical sockets 108, 118 and a driver circuit 132. The driver circuit 132, in turn, may comprise a hardware counter that implements a relatively short (e.g., less than 1 second) timer 133, such as a countdown timer or counter timer; a network interface 134 capable of receiving and sending commands via a communication protocol, such as a Bluetooth®, infrared, IEEE® 802.11x, or Power-Line Communication (PLC) protocol; a read-only memory unit 135 that stores a serial number for the IoT device 102, 112; a secondary, readable/writeable memory 136 capable of storing a shared secret for the group (only one IoT device 102, 112 depicted in detail for clarity). In some embodiments, each IoT device 102, 112 may also include a light emitting diode (LED) light emitter 138.

The system 100 in this embodiment may also include a remote controller, such as a control console 120 having a network interface compatible with the network interfaces 134 of the IoT devices 102, 112. Additionally, or alternatively, some embodiments may use a smart phone 123 having application software 124 as the remote controller. The remote control console 120 and/or the smart phone application 124 may also include a "promotion" button 128 in some embodiments.

In operation, during an initial registration phase, an owner/user of the IoT devices 102, 112 may first identify one of the IoT devices 102 on the first power supply loop 104 to be elected as a "leader" IoT device 102'. Any IoT device 102 may be selected for this role, but advantageously, the IoT device 102' selected for promotion should be centrally located inside the owner/user's home or business for better wireless performance.

In some embodiments, the owner/user may promote the leader IoT device 102' by placing the remote control console 120 (and/or smart phone 123) near the selected the IoT devices 102 and then activate the promotion button 128 for a predefined number of seconds or by performing a specific sequence of button presses (e.g., three presses within three seconds). In response, the remote control console 120 (and/or smart phone 123) may use a seed-code stored in its memory to generate a group identifier (i.e., a shared secret) for a logical group of IoT devices 102, 112. The logical group of IoT devise may comprise one or more of the physical IoT devices 102, 112.

By default, whenever a new physical IoT device(s) 102 is initially powered on using the switch 106, 116, its timer 133 may automatically activate and begin (e.g., in the case of a countdown timer embodiment, counting down to zero). While the timer is active, the IoT device(s) may automatically accept pairing requests in some embodiments. Once the timer completes, the IoT device(s) 102 may automatically reject pairing requests in some embodiments. In this way, the timer 133 in these embodiments defines a time period in which the IoT device 102 is in a discovery mode; that is, a time period in which the IoT device 102 may accept pairing signals coming from a designated leader IoT device 102'. Moreover, as the IoT devices 102, 102' are on the same power supply circuit 104 (e.g., corresponding to light sockets in same ceiling structure), they may all be powered on at the same time, and thus, their respective discovery periods may start and end at the same time.

Each IoT device 102 may also be also equipped with a unique identifier (e.g., a manufacturer code and serial number, a universally unique identifier (UUID) or globally unique identifier (GUID), a media access control (MAC) address, and the like) stored in the read-only memory 135, and a secondary code stored in the secondary, readable/writeable memory 136. The codes in the secondary memory 136 may initially be all set to the same default value (00000 . . . 00000) for all the new IoT devices 102, 112, but that value may be changed during the pairing process described below.

After promotion of an identified IoT device 102 to the leader IoT device 102', the leader IoT device 102' may perform a number of coordination activities including generating a group identifier using a hash function having one or more of the following as input: (i) a seed value transmitted from the remote control console or application, (ii) the value of the timer taken from the selected IoT device 102 at the moment of the pairing phase with the remote control console or smart phone application; and (iii) the unique identifier of the selected IoT device 102 in memory unit 135. Communication of the relevant information may be done by exploiting the short-range communication protocol, in some embodiments. Once the group identifier is generated, it may then be saved to the selected leader IoT device 102' by erasing the default value of the secondary code and replacing it with the generated group identifier. This group identifier may then serve as a shared secret for a logical group of IoT devices 102, 102' that form a wireless ad hoc network.

Once the group identifier is saved in the leader IoT device 102', the leader device 102' may start broadcasting the group identifier. Other IoT devices 102 in area may receive that group identifier and use it to pair with selected leader 102'. The group identifier for the group may be saved by the follower IoT devices 102 in some embodiments, and these now-paired follower IoT devices 102 may stop broadcasting and searching for the leader IoT device 102'. In this way, the IoT devices 102, 102' form an ad hoc network. Additionally, in embodiments using a counter timer, the leader bulb 102' in these embodiments may also transmit the counter's value, thereby also protecting the shared secret for the logical group.

When the registration is completed, the leader IoT device 102' may act as a proxy for the ad hoc network in some embodiments, and forward commands such as power off/on, dim output, change light color, etc. to the others IoT devices 102 registered with its group identifier. These embodiments may be desirable because having the same identifier spread through the IoT devices 102 may let these IoT devices 102, 102' act as a single logical group, because the grouping command can be sent to the leader device 102' and then forwarded to the follower device(s) 102.

In other embodiments, the remote control console 120, smart phone 123, and other console device (not shown) may directly send commands to all of the IoT devices 102, 102' using the leader's identifier as a group identifier. These embodiments may be desirable because they can simultaneously send commands with different group identifiers to multiple logical groups of IoT devices.

In some embodiments, in case of a replacement of a follower IoT device 102 registered to the leader device 102' (e.g., replacing a broken one) or if a new IoT device 102 is to be installed and paired, the new IoT device 102 may be the only one broadcasting and searching for the leader 102'. The new IoT device 102 may detect the leader 102' and may receive the group identifier as described above. In case the leader device 102' itself needs to be replaced, the above registration process(s) should be executed again.

Figure 2:
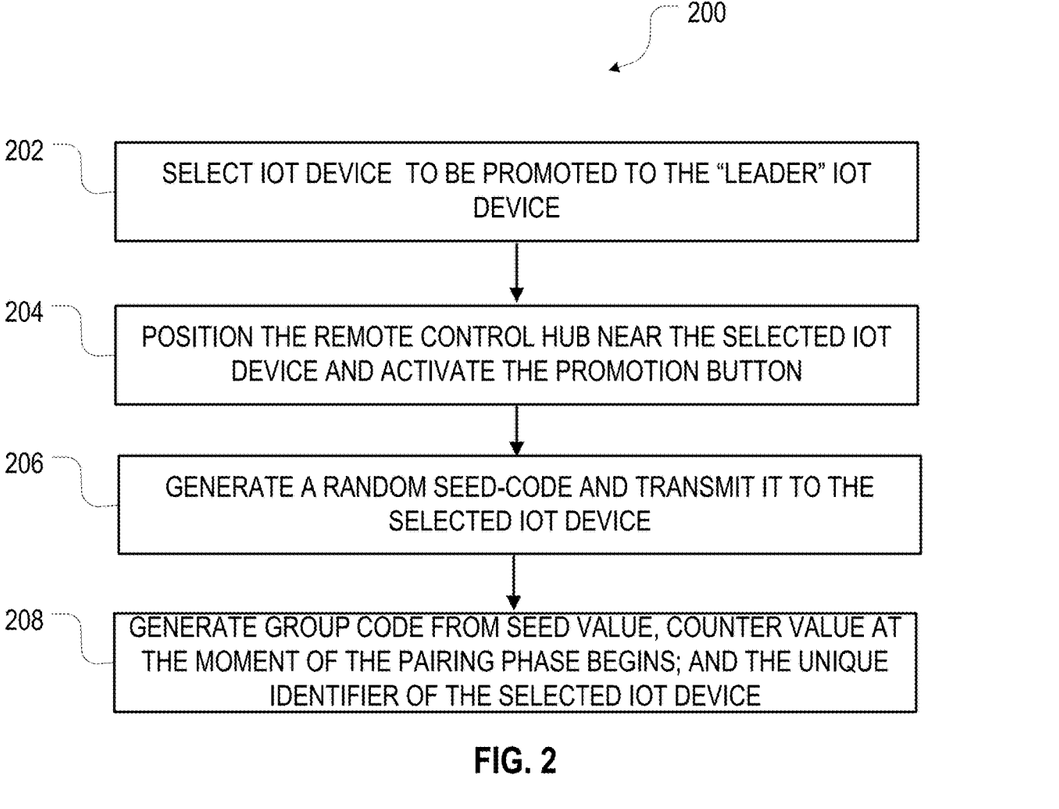
FIG. 2 is a flow chart illustrating one method of designating an IoT device as a leader IoT device, consistent with some embodiments.

FIG. 2 is a flow chart illustrating one method 200 of designating an IoT device 102 as a leader IoT device 102', consistent with some embodiments. At 202, one of the IoT devices 102 may be selected by the user for promotion to the "leader" IoT device 102'. At 204, the user positions the remote control console 120 (or smart phone 123) near the selected IoT device 102 and then activates a promotion mechanism, such as the "promotion button" 128 for a predefined number of seconds or by providing a specific sequence of pressed button (e.g., three presses within three seconds). At 206, the remote control console 120 (or smart phone 123) may generate a random seed-code and transmit it to the selected IoT device 102. Alternatively, the remote control console 120 and/or smart phone may request that the selected IoT device 102 transmit its unique identifier. Communication of the relevant information may be done by exploiting the short-range communication protocol, in some embodiments.

At 208, a group identifier may be generated by applying a hash function having the following as input: (i) the seed value transmitted from the remote control console 120 or smart phone application 124, (ii) the value of the timer 133 taken at the moment of the pairing phase with the remote control console 120 or smart phone application 124; and (iii) the unique identifier of the selected IoT device 102 stored in the read-only memory 135. In some embodiments, this operation may be performed on the remote control console 120 or smart phone application 124. In other embodiments, it may be performed by the IoT device 102 selected for promotion to leader IoT device 102'. Once the group identifier is generated, it may then be saved by (and/or transmitted to) the selected IoT device 102', which may overwrite the default value of the secondary code in its secondary memory 136.

Figure 3:
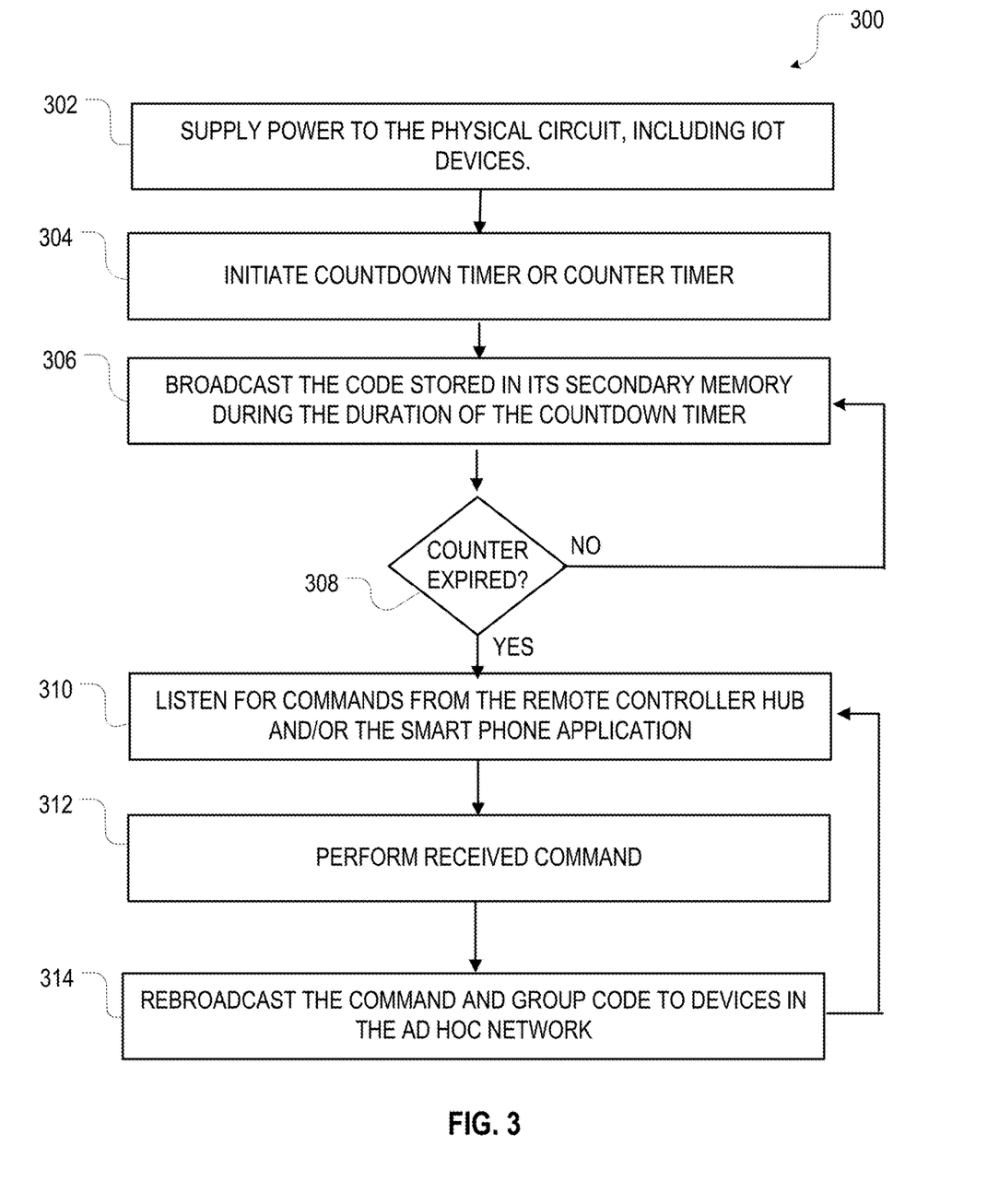
FIG. 3 is a flow chart illustrating one pairing method for the leader IoT device, consistent with some embodiments.

FIG. 3 is a flow chart illustrating one pairing method 300 for the leader IoT device 102', consistent with some embodiments. At 302, the user uses the power switch 106 to supply power to the first power supply loop 104, including all of the IoT devices 102, 102' on that physical circuit. Upon receiving power, the leader IoT device 102' may initiate its timer 133 at 304. At operations 306-308, the leader IoT device 102' may broadcast the code stored in its secondary memory 136 during the duration of the timer. Because the method in FIG. 3 is performed by a leader IoT device 102', this code may be the group's identifier. Once the timer has expired (308: Y), then at 310, the leader IoT device 102' may begin listening for commands from the remote control console 120 and/or the smart phone 123. If a command is received, the leader IoT device 102' may perform the command at operation 312 (e.g., any command supported by the IoT device, such as on/off, increase illumination, change color, etc. for embodiments where the IoT device is a smart light bulb) The leader IoT device 102' may also rebroadcast the command and its group identifier to any/all the follower IoT devices 102 in its ad hoc network in some embodiments at 314. Those other devices may respond to this rebroadcast by also performing the command received at 312.

Figure 4:
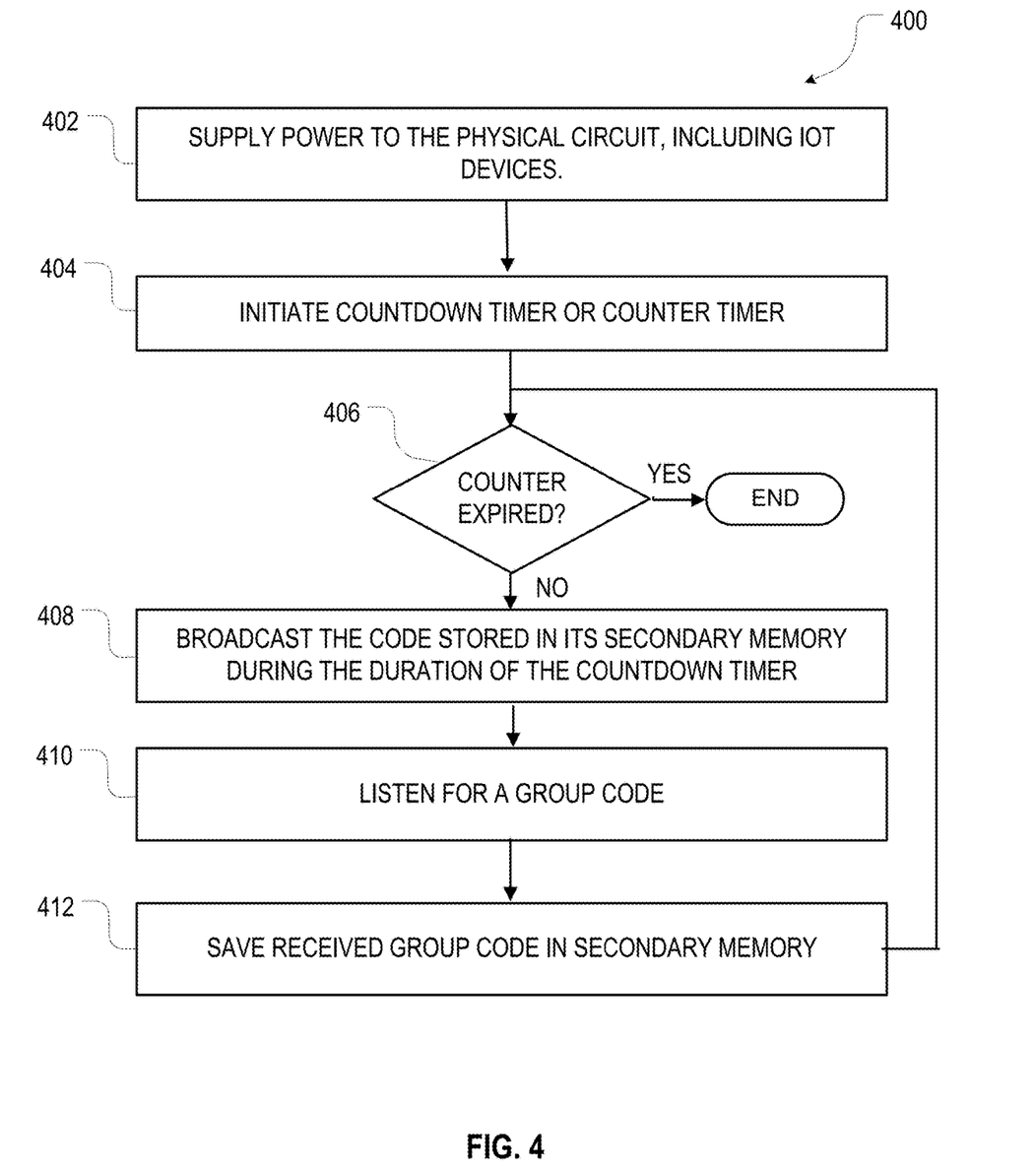
FIG. 4 is a flow chart illustrating one pairing method for a new IoT device, consistent with some embodiments.

FIG. 4 is a flow chart illustrating one pairing method 400 for a new IoT device $102_{new}$, consistent with some embodiments. At 402, the user uses the power switch 106 to supply power to the first power loop 104, including the new IoT device $102_{new}$ and the existing leader 102' and follower 102 IoT devices on that physical power loop 104. Upon receiving power, the new IoT device $102_{new}$ may initiate its timer 133 at 404, and then perform loop 406-412 for the duration of that time period. At 408, the leader IoT device 102 may broadcast the code stored in its secondary memory 136 during the duration of the timer. Because this is a new IoT device $102_{new}$, the value may be a default/null value. At 410, the new device $102_{new}$ also listens for group identifiers being transmitted by other IoT devices 102, 102'. If, and only if, the new IoT device $102_{new}$ detects a group identifier before its timer 133 expires, then the new IoT device $102_{new}$ may replace the code in its secondary memory 136 with the received group identifier at 412. That is, the new IoT device $102_{new}$ may reject any broadcast group identifiers received after the timer 133 finishes. After updating the secondary memory at 412, new IoT device $102_{new}$ is now paired to the leader IoT device 102' as a follower IoT device.

Figure 5:
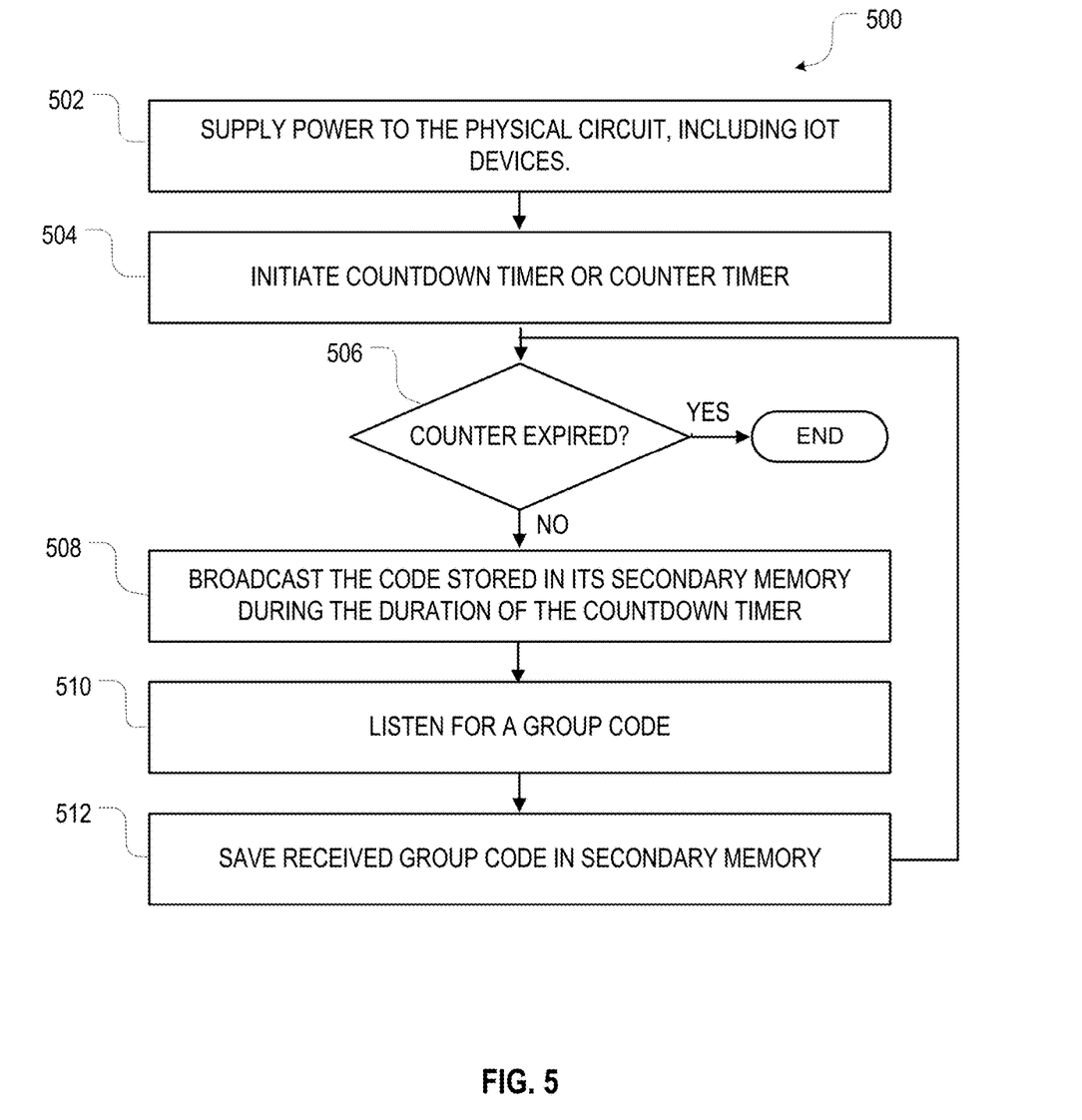
FIG. 5 is a flow chart illustrating one pairing method for a follower IoT device, consistent with some embodiments.

FIG. 5 is a flow chart illustrating one pairing method 500 for a follower IoT device 102, consistent with some embodiments. At 502, the user uses the power switch 106 to supply power to the first power loop 104, including all of the IoT devices 102, 102' on that physical circuit. Upon sensing power, the follower IoT device 102 may initiate its timer 133 at 504, and then perform loop 506-512 for the duration of that time period. At 508, the follower IoT device 102 may broadcast the code stored in its secondary memory 136 during the duration of its timer 133. Because this follower IoT device 102 has already been paired to a leader IoT device 102', the broadcast value may be the group identifier for the logical group. At operation 510, the follower IoT device 102 may listen for new group identifiers being transmitted by other IoT devices 102, 102'. If, and only if, follower device 102 detects a new group identifier during the timer period, then the follower IoT device 102 may replace the current group identifier in its secondary memory 136 with the new group identifier. That is, the follower IoT device 102 may reject any new group identifiers broadcast after its timer 133 finishes. Moreover, because the timer 133 is relatively short, it is unlikely to receive any such broadcasts. Accordingly, the follower IoT device 102 may remain paired to the current leader IoT device 102' as a follower.

Figure 6:
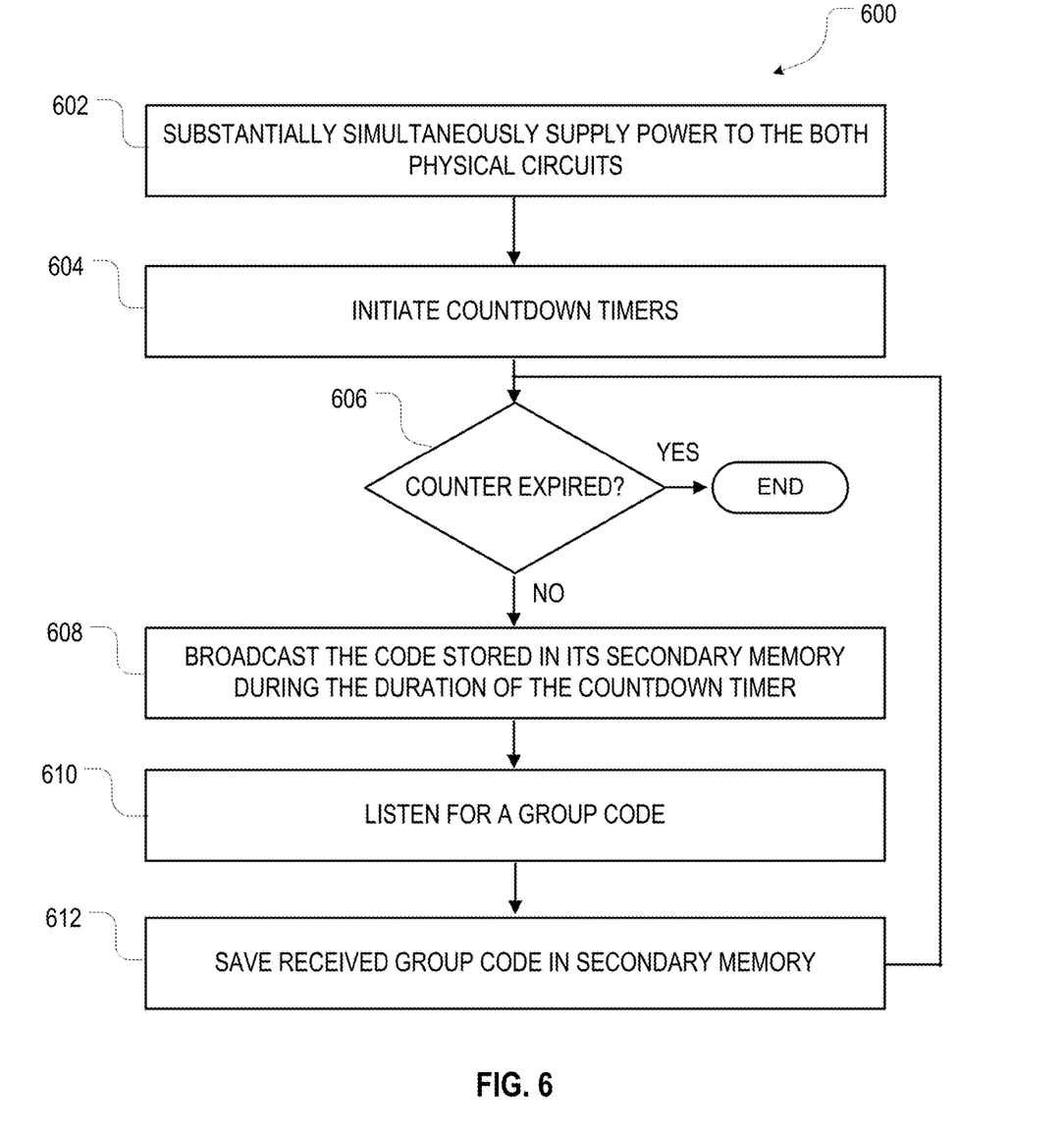
FIG. 6 is a flow chart illustrating one pairing method for a follower IoT device on a second power supply loop, consistent with some embodiments.

FIG. 6 is a flow chart illustrating one pairing method 600 for a follower IoT device 112 on a second power supply loop 114, consistent with some embodiments. At 602, the user may substantially simultaneously supply power to both sets of IoT devices 102, 112, using the first and second power switches 106, 116. Because the timer's 133 duration is relatively short (e.g., less than 1 seconds), this may require an assistant. Upon receiving power, the IoT devices 102, 102', 112 on both circuits 104, 114 may all initiate their timers 133 at 604 and may begin loop 606-612. Because the two power switches 106, 116 were activated nearly simultaneously, the timers 133 in all of the IoT devices should all be active for at least part of their respective timer periods. At 608, the IoT device 112 may broadcast the code stored in its secondary memory 136 during the duration of its timer 133. At 610, the IoT device 112 may listen for new group identifiers being transmitted by other IoT devices, such as the leader IoT device 102' on the first power supply loop 104. If, and only if, the IoT device 112 detects a group identifier during the timer 133 period, then the IoT device 112 may replace the default code in its secondary memory 136 with the received group identifier. That is, the IoT device 112 may reject any broadcast group identifiers after its timer 133 finishes. After updating the secondary memory at 612, the IoT device 112 on the second power loop 114 is now paired to a leader IoT device 102' on the first power loop 104 as a follower IoT device.

Figure 7:
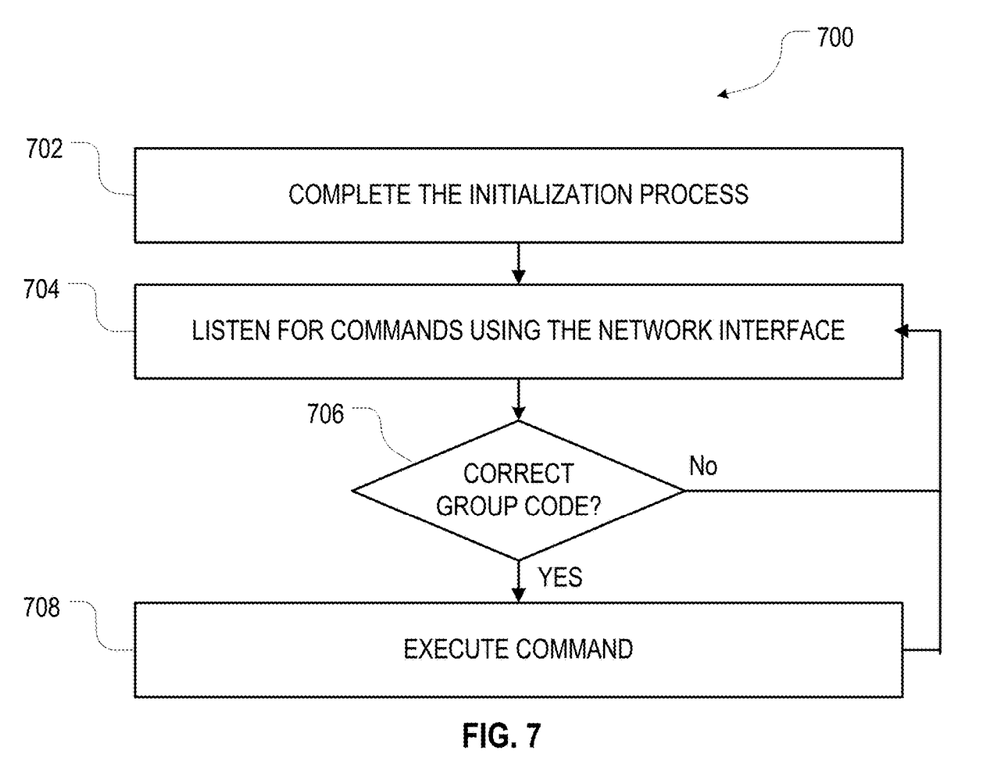

FIG. 7 is a flow chart illustrating one method of normal operation of a follower IoT device 102, consistent with some embodiments. At 702, the follower IoT device completes the pairing processes described with reference to FIGS. 2-6. At 704, the follower IoT device 102 begins listening for commands using its network interface 134. Upon receipt of a command, the follower IoT device 102 first determines at 706 whether the command contains a group identifier that matches the code stored in its secondary memory 136. If the codes match, then the follower IoT device 102, 112 executes the command at 708. If the codes do not match, then the follower device rejects the command.

Although the present invention has been described in detail with reference to certain examples thereof, it may be also embodied in other specific forms without departing from the essential spirit or attributes thereof. For example, the present invention may be a system, a method, and/or a computer program product at any possible technical detail level of integration. The computer program product may include a computer readable storage medium (or media) having computer readable program instructions thereon for causing a processor to carry out aspects of the present invention. The computer readable program instructions can be stored and executed on a single computer or divided amongst different computers, at the same location or different locations, for storage and execution.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the customer's computer, partly on the customer's computer, as a stand-alone software package, partly on the customer's computer and partly on a remote computer or entirely on the remote computer or server. In the latter scenario, the remote computer may be connected to the customer's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects of the present invention were described herein with reference to flowchart illustrations and/or block diagrams of methods, apparatus (systems), and computer program products according to embodiments of the invention. It may be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature.

Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A method for discovering and logically grouping smart light bulbs, the method comprising:
 connecting a plurality of smart light bulbs to a common power loop having a power switch, wherein each of the plurality of smart light bulbs includes a LED driver circuit that selectably controls power to a LED, the LED driver circuit comprising:
  a timer that initiates upon closure of the power switch;
  a wireless adapter adapted to receive a logical group identifier; and
  a writeable memory that automatically accepts or rejects the logical group identifier based on a state of the timer;
 promoting one of the plurality of smart light bulbs to leader using a controller; and
 closing the power switch to the plurality of smart light bulbs to automatically initiate their respective timers.

2. The method of claim 1, wherein the wireless adapter is further adapted to automatically broadcast a group identifier for a wireless ad hoc network to the plurality of smart light bulbs.

3. A smart light bulb, comprising:
 a LED; and
 a LED driver circuit that selectably controls power to the LED, the LED driver circuit comprising:
  a timer that automatically initiates upon receipt of power to the LED driver circuit from an external power supply loop;
  a wireless adapter adapted to receive a logical group identifier directly from another smart light bulb; and
  a writeable memory that automatically accepts or rejects the logical group identifier based on a state of the timer.

4. The smart light bulb of claim 3, wherein the LED driver circuit further comprises a readonly memory unit containing an identifier for the controller.

5. The smart light bulb of claim 3, wherein the wireless adapter is further adapted to:
 receive a command;
 append the group identifier to the command; and
 rebroadcast the command with the group dentifier.

6. The smart light bulb of claim 3, wherein the writeable memory is adapted to store accepted group identifiers.

7. The smart light bulb of claim 3, wherein the wireless adapter comprises a BLUETOOTH adapter.

8. The smart light bulb of claim 3, wherein the wireless adapter comprises an infrared adapter.

* * * * *